(No Model.)

J. J. PINKHAM.
WAGON TIRE COUPLING.

No. 359,361. Patented Mar. 15, 1887.

WITNESSES:
C. Neveux
C. Sedgwick

INVENTOR:
J. J. Pinkham
BY Munn & Co
ATTORNEYS.

United States Patent Office.

JAMES J. PINKHAM, OF STILLWATER, MONTANA TERRITORY.

WAGON-TIRE COUPLING.

SPECIFICATION forming part of Letters Patent No. 359,361, dated March 15, 1887.

Application filed November 2, 1886. Serial No. 217,812. (No model.)

*To all whom it may concern:*

Be it known that I, JAMES J. PINKHAM, of Stillwater, in the county of Yellowstone and Territory of Montana, have invented a new and Improved Wagon-Tire Coupling, of which the following is a specification, reference being had to the annexed drawings, forming a part thereof, in which—

Figure 1:
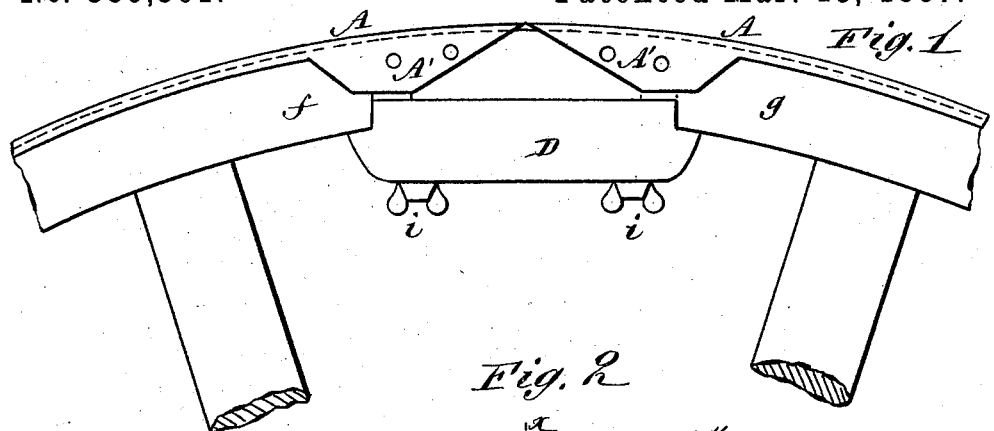
Figure 2:
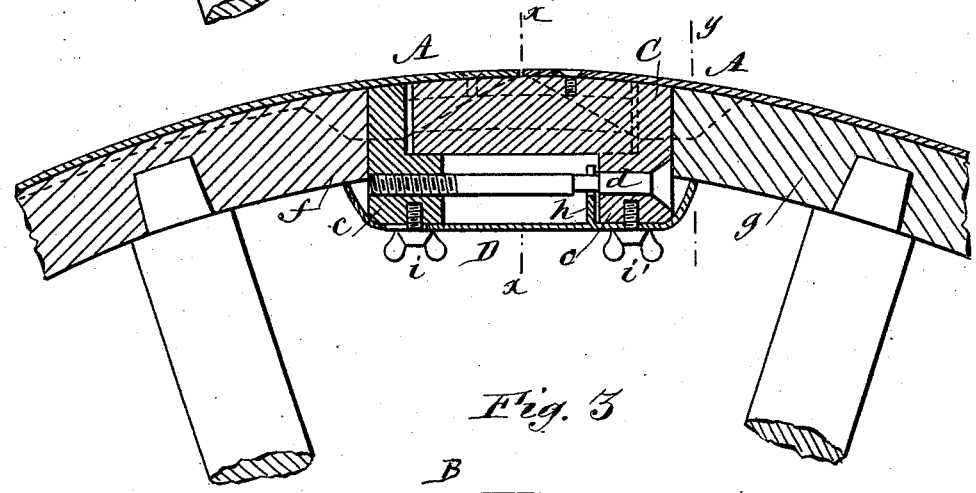
Figure 3:
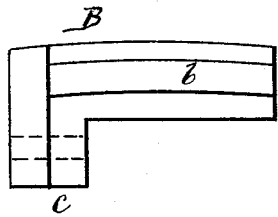
Figure 4:
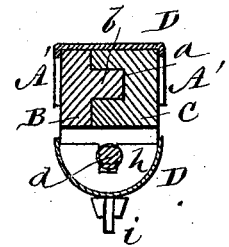
Figure 5:
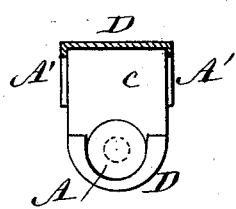

Figure 1 is a side elevation of a portion of a wagon wheel and tire, showing the application of my improved coupling. Fig. 2 is a longitudinal section. Fig. 3 is a side elevation of one of the halves of the coupling. Fig. 4 is a transverse section taken on line $x\,x$ in Fig. 2, and Fig. 5 is a transverse section taken on line $y\,y$ in Fig. 2.

Similar letters of reference indicate corresponding parts in all the views.

The object of my invention is to provide a simple and efficient device for connecting the ends of wagon-tires to render the tires adjustable, so that they may be set or readjusted without heating the tire and without the aid of a blacksmith.

My invention consists in the construction and arrangement of parts, as will be hereinafter fully described, and specifically pointed out in the claim.

To opposite ends of the tire A are secured the lugs B C, the lugs projecting about half their length beyond the ends of the tire. The side of the lug C is provided with a groove, $a$, to receive a tongue, $b$, formed on the lug B. The tongue and groove are preferably formed on a curve of the same radius as the corresponding part of the felly; but as the curvature is slight the tongue and groove may without detriment be made straight. The lugs B extend beyond the ends of the tire and overlap each other, forming a secure joint. The lug C is provided with an ear, $c$, which is apertured to receive the screw $d$, extending through the ear into a threaded aperture in the ear $e$, formed on the lug B. The tire A is made of a suitable length to surround the wheel, and the ends of the fellies $f\,g$ are cut away to make room for the lugs B C. Each end of the tire is provided on opposite sides with lips A', which extend down over the sides of the fellies and over the coupling, covering the joint between the coupling and the fellies. The portion of the screw $d$ adjoining the ear $c$ is squared to receive the notched plate $h$, attached to the cover D.

The cover D is adapted to inclose the screw and all of the parts of the coupling on the inner side of the wheel-rim, the cover being held in its place by screws $i\,i'$, projecting through it into the ears $c$. The screw $i$ passes through a slot in the cover D, which allows the cover to move longitudinally on the screw.

The tire A is placed upon the wheel after loosening the screw $d$, and when in the position of use its ends are drawn together by turning the screw $d$. The tongue and groove of the lugs B C render the joint rigid, so that the fellies will not yield at that point. When it is desired to tighten the tire, the cover D is removed, and the ends of the tire are separated by unscrewing the screw $d$, when they are filed away and again drawn together around the wheel, and the cover D is replaced, bringing the notched plate $h$ into engagement with the square part of the screw, thus preventing it from turning.

Having thus fully described my invention, I claim as new and desire to secure by Letters Patent—

The combination, with the tire, of the lugs B C, projecting beyond the ends thereof, and formed with a tongue-and-groove connection on their adjacent vertical inner sides, and with longitudinally-apertured ears $c\,c$ on their lower faces, and a screw engaging said apertures for adjusting said lugs, substantially as set forth.

JAMES J. PINKHAM.

Witnesses:
C. H. COUNTRYMAN,
O. F. HANIGER.